Dec. 27, 1966  H. GOTTFRIED ET AL  3,293,772
TRAY LYOPHILIZATION APPARATUS
Filed Oct. 4, 1965  5 Sheets-Sheet 1

HERBERT GOTTFRIED
SAMUEL NATELSON
INVENTORS

BY George B. Ziegerath

ATTORNEY

HERBERT GOTTFRIED
SAMUEL NATELSON
INVENTORS

Dec. 27, 1966  H. GOTTFRIED ET AL  3,293,772
TRAY LYOPHILIZATION APPARATUS

Filed Oct. 4, 1965  5 Sheets-Sheet 4

HERBERT GOTTFRIED
SAMUEL NATELSON
INVENTORS

BY George B. Auspitt

ATTORNEY

Dec. 27, 1966  H. GOTTFRIED ET AL  3,293,772

TRAY LYOPHILIZATION APPARATUS

Filed Oct. 4, 1965  5 Sheets-Sheet 5

HERBERT GOTTFRIED
SAMUEL NATELSON
INVENTORS

BY *[signature]*

ATTORNEY

United States Patent Office 3,293,772
Patented Dec. 27, 1966

3,293,772
TRAY LYOPHILIZATION APPARATUS
Herbert Gottfried, 3441 5th St., Oceanside, Long Island, N.Y. 11572, and Samuel Natelson, 5508 Hyde Park Blvd., Chicago, Ill. 60615
Filed Oct. 4, 1965, Ser. No. 492,730
10 Claims. (Cl. 34—92)

This application is a continuation-in-part of the Samuel Natelson and Herbert Gottfried U.S. patent application Serial No. 366,788 filed May 12, 1964, now U.S. Patent No. 3,245,152.

The present invention relates to lyophilization or freeze drying and more particularly to an apparatus for lyophilization of samples in containers.

Lyophilization is a process used extensively in clinical chemistry and is the drying in vacuum from the frozen state. Water is removed by sublimation from frozen material and the solute is left as a porous solid. The solute is sealed in vacuo after drying, and retains its biological attributes for long periods. A typical apparatus for carrying out rapid high-vacuum desiccation of frozen suspensions of biologic materials has been described in A. J. Salle, "Fundamental Principles of Bacteriology," 4th edition, McGraw-Hill, 1954. The apparatus described is quite complicated and consists of containers for frozen material to be dried connected to a manifold which conveys the water vapor to a condensing chamber. The instrument is evacuated by means of a suction pump. All the devices of the prior art, are quite elaborate and usually have special vessels to which the material to be treated must be transferred. Thus, with regard to freeze drying in containers, a tray holding a container of sample substance is frozen. The tray is then inserted into a vacuum chamber. The chamber is sealed and evacuated. Intermediate between the vacuum pump and the tray chamber is a chamber cooled to a temperature of less than $-50°$ F. The vapor from the ice (if water is the solvent) is condensed in the cooled chamber by molecular distillation and the sample is eventually dried or "lyophilized." In this manner, heat sensitive substances may be preserved. However, to preserve the substance, the container must be sealed so that the substance is preserved in a vacuum. This then requires that a seal or stopper be placed on the container while it is in the vacuum chamber.

In the systems used at present, the sample substance is in a container on a tray in a vacuum chamber. This produces the problem of supplying the heat to the sample necessary to maintain the ice just below its freezing point ($+32°$ F.). Otherwise the evaporation rate drops as heat is removed from the ice and the temperature drops. This lowers the vapor pressure to the point where evaporation is very slow requiring long periods of time before lyophilization is complete. A serious problem with tray drying when the tray is in a vacuum is the difficulty in transmitting heat through a vacuum.

In order to overcome this disadvantage to tray drying, some prefer to evaporate from closed flasks attached to the vacuum line allowing the heat from the atmosphere to supply the energy to the material being evaporated. Since flask drying is inconvenient in many applications tray drying is preferred by many. In order to supply the heat, various methods have been applied. Among these have been the applications of infrared heating or direct electrical heating. With electrical heating the heat must travel from the bottom of the ice to the top where evaporation is taking place. This is an inefficient process since ice is not a good conductor of heat. Further, after evaporation has taken place there is a tendency to overheat the material since one cannot predict the exact time when all the ice is removed. This latter deficiency is also caused with infrared heating.

Some have used heating on the walls of the vacuum chamber allowing some air or inert gas to bleed into the vacuum chamber so that the vacuum is maintained at 300 to 500 microns' pressure. This gas is supplied to circulate the heat and thus heat the trays. This also cuts down on the rate of evaporation since higher pressures are being used than customary (about 10–20 microns), partially defeating the purpose of the instrument which is to create a greater vapor pressure difference between the sample and the condensing chamber.

Present tray freeze driers need a large volume to be evacuated since the trays are bulky. Thus high capacity vacuum pumps are required. The chamber walls need to be very thick to withstand the pressure in such large chambers. The more trays to be used the larger becomes the vacuum chamber. This results in an expensive instrument with heavy walls. Furthermore, when the sample is in a container, it is extremely difficult to seal the container within the freeze drier.

The present invention solves the problems discussed above in an inexpensive manner permitting the evaporation of large numbers of sample substances in containers on trays located in a thin walled chamber. It also supplies a controlled amount of heat so that evaporation can take place at any temperature desired which may be maintained constant. It also permits protection against heat after lyophilization. After lyophilization has taken place, a temperature sensor placed in the tray indicates the temperature by sensing the rise in temperature above the melting point of ice. When the temperature reaches 4° C. the heat is automatically shut off by means of a switch. The lyophilizing cabinet is now cooled by cooling coils. Thus the dried material is automatically kept below 4° C. for its preservation. It permits the sealing of the container and removal of any individual tray at any time without disturbing the other trays which are still evaporating. The instrument does not put any serious limitation on the shape or size of the tray or the material from which it is made except that the tray must be able to withstand the pressure produced on its walls by a vacuum within. Glass, metal and plastic trays may be used. Thus, the present invention provides for a simple apparatus which is useful in the lyophilization of biologic materials, and which can readily accommodate almost any type of commercially available container which has to be sealed under vacuum conditions to preserve the sample substance which has been lyophilized therein.

Therefore, the object of the present invention is to provide an instrument useful in freeze drying of sample substances in containers which is inexpensive to manufacture, of a simple construction and can be used with common laboratory containers.

With the foregoing and other objects in view, the invention resides in the novel arrangement and combination of parts and in the details of construction hereinafter described and claimed it being understood that changes in the precise embodiment of the invention herein disclosed may be made within the scope of what is claimed without.

Other objects and advantages will become apparent from the following description taken in conjunction with the accompanying drawing in which.

Figure 1:
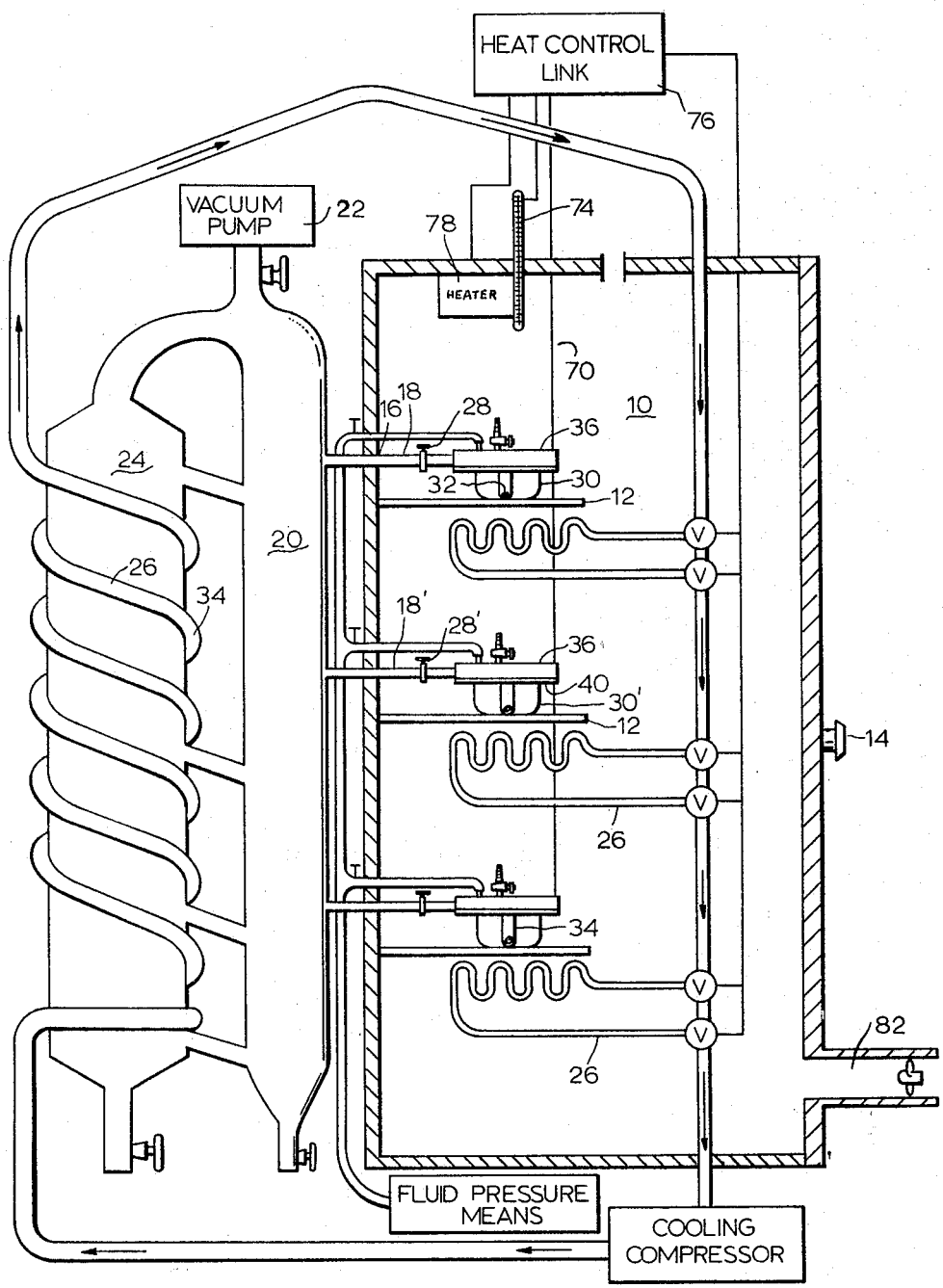
FIGURE 1 is a side view partly through the system of a freeze drying arrangement contemplated herein.
Figure 2:
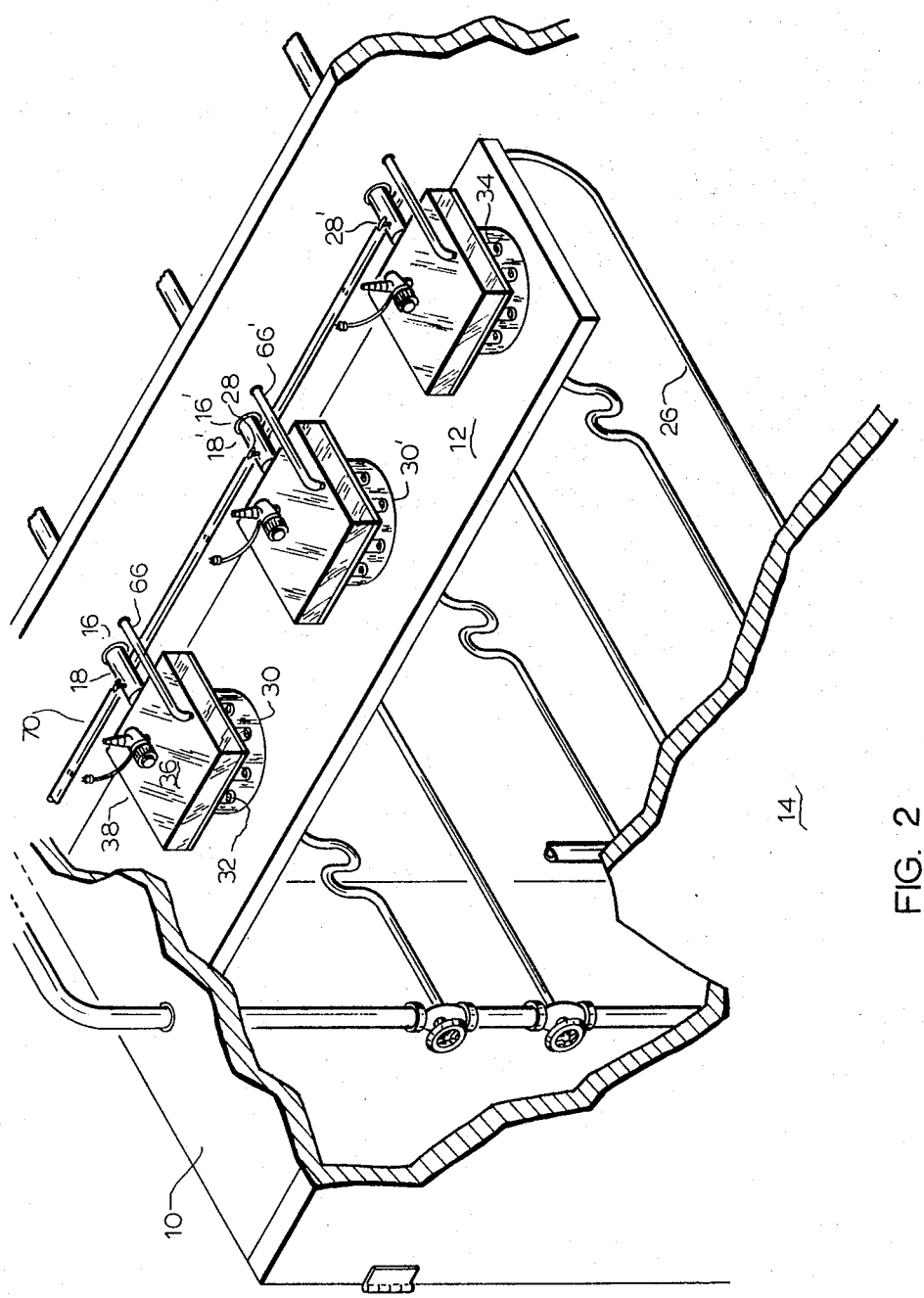
FIGURE 2 is a prespective view of a freeze drying arrangement contemplated herein.
Figure 3:
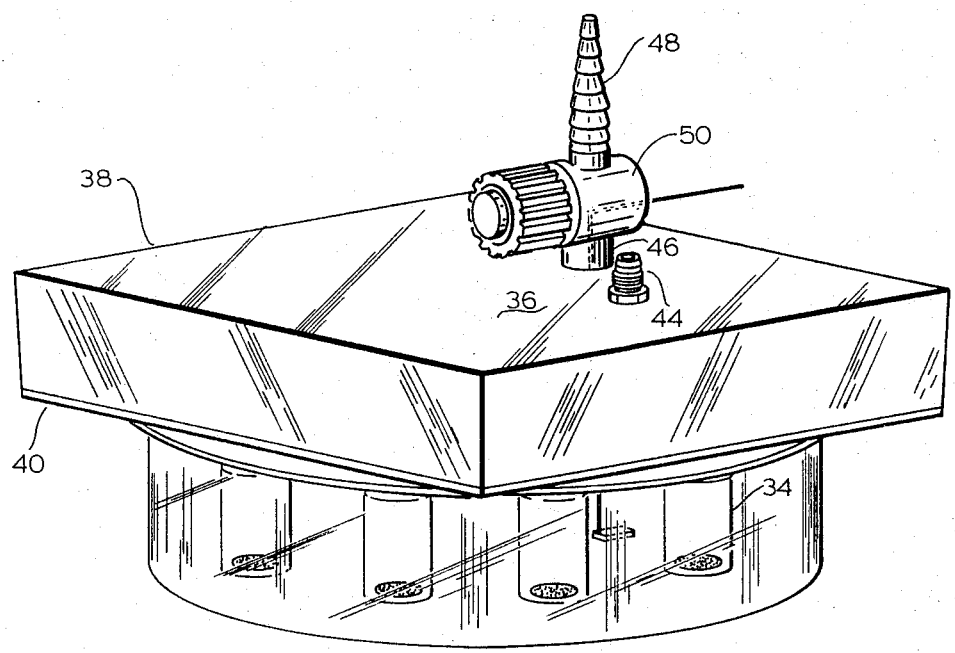
FIGURE 3 shows a perspective view of one of the units shown in FIGURES 1 and 2.
Figure 4:
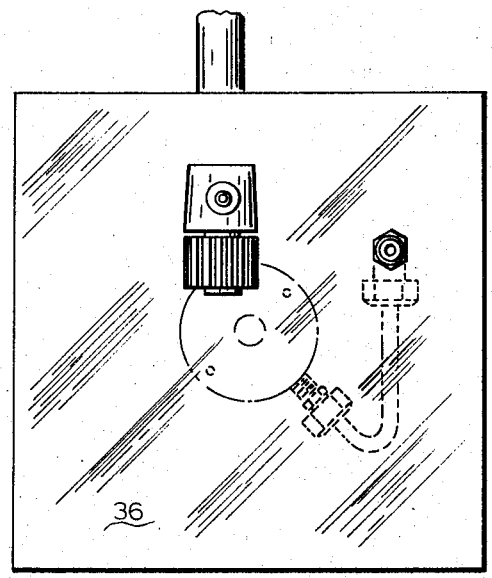
FIGURE 4 illustrates a top view of the unit shown in FIGURE 3.
Figure 5:
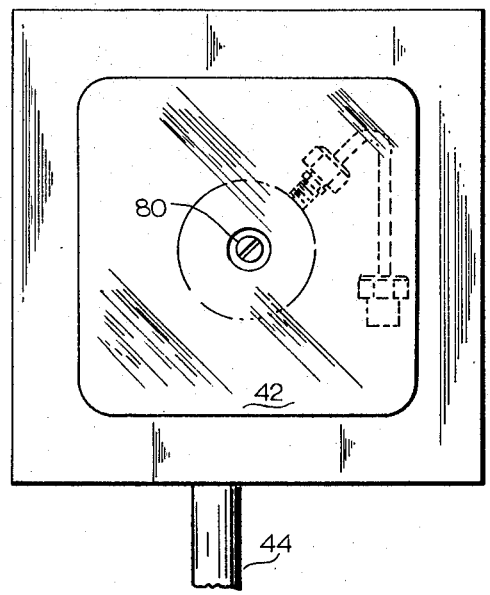
Figure 6:
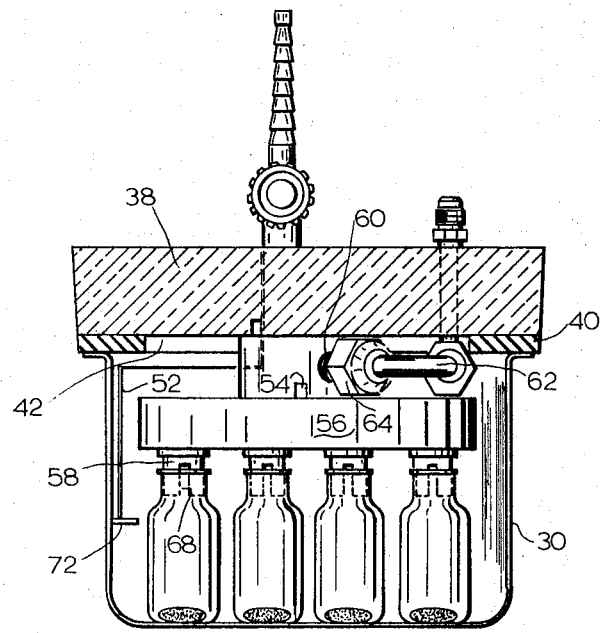
Figure 7:
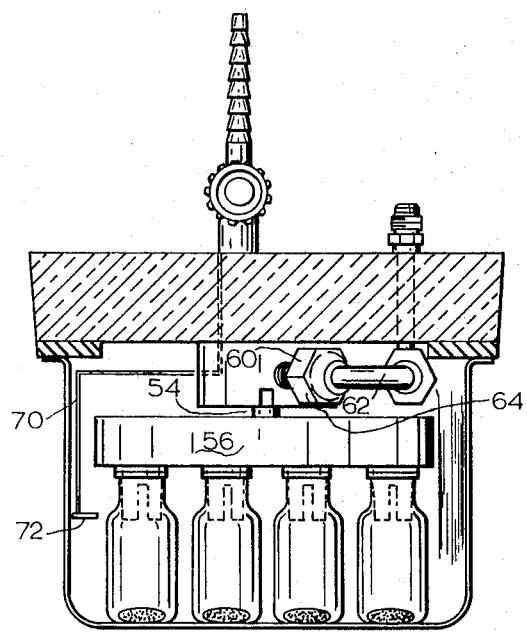

FIGURE 5 presents a bottom view of the unit shown in FIGURE 3;

FIGURE 6 is a partly perspective partly cross-sectional view of the unit shown in FIGURES 3, 4 and 5 with the containers in the open position; and, FIGURE 7 is a partly perspective partly cross-sectional view corresponding to FIGURE 6, but when the containers are in the closed position.

Although the lyophilization arrangements of the prior art required cabinets with very thick walls to maintain a vacuum therein and, the sealing of the inner container required complicated mechanical apparatus, one of the key features in the present invention is that a thin wall cabinet is used and the sample substance container is sealed in a simple manner. The lyophilization is accomplished by the combination of a cabinet and a small lyophilization device herein described. The size of the cabinet and its walls does not increase radically with an increase in the number of trays. The small lyophilization device furthermore includes means for sealing the sample substance containers.

Shown in the drawing is a cabinet 10 with a plurality of shelves 12, and a door 14. The cabinet has a plurality of apertures 16, 16' at the rear thereof opposite the door and through each aperture is a suction line 18, 18' leading to a vacuum manifold 20. This vacuum manifold is coupled to a vacuum pump 22. This arrangement is more fully described in the parent application Serial No. 36,788 of which the present application is a continuation-in-part. Communicating with the manifold is a cooled chamber 24 having a cooling coil arrangement 26. The cabinet is maintained at atmospheric pressure. There is also a blower to pump air or other gas such as nitrogen at a controlled temperature (the heater and temperature control are also shown) through the cabinet to supply the heat necessary for the lyophilization at constant temperature.

Each suction line 18, 18' includes a stop cock 28, 28' and is used to evacuate a vessel 30, 30' having a biologic sample substance or material 32 therein it is desired to freeze dry. This biologic material is contained in a flask or container 34. Disposed over vessel 30 is cover device 36 which comprises an inert, transparent flat medium 38, e.g., plastic or glass, to one side of which will be affixed an inert, rectangular, resilient sealing medium 40, e.g., rubber; the sealing medium being substantially the same size as the solid medium. Centrally disposed in the flat medium and sealing medium (if one is used) is an aperture 42, and leading from this aperture 42 in the solid medium is an evacuation duct 44 which is affixed to the suction line 18 of the pump apparatus. Disposed in the solid medium 38 and communicating with evacuation duct 44 is an inlet line 46 having a bleeder inlet 48 and a valve 50.

Within aperture 42 is a piston chamber 52 housing a fluid operated piston rod 54. Piston 54 moves vertically in and out of piston chamber 52 and has a piston plate 56 on the outer end thereof. Piston plate 56 is designed to rest horizontally on stoppers 58 for flask container 34. Piston chamber 52 has a fluid inlet tube 60 which is designed to receive a fluid supply line 62 which includes coupling means 64. Fluid supply line 62 passes through cover device 38 and is threaded for attachment to additional fluid input lines 66, 66'. When a fluid, e.g. compressed air is fed through fluid supply line 62 and applied to piston 54, the piston will move plate 56 down so as to press stoppers 58 firmly on the container. Stoppers 58 have a side slit 68. In the up position, gas can pass freely through this side slit. But, when pressed down, the container is sealed.

Also passing through cover device 36 is an electrical line 70 at the end of which is a temperature sensitive element 72. Line 70 as well as thermometer 74 terminate in heat control unit 76. This unit in turn controls heater 78.

In order to treat the biologic material 32, lyophilization device 36 is disposed over the vessel 30 so that the sealing medium 40 engages the top thereof. Meanwhile evacuation duct 44 is connected to the suction line 18 and the pump is turned on. With the evacuation of the air in vessel 30, the lyophilization apparatus can be lifted and the vessel 30 will cling to the sealing medium 40 because of the outer atmospheric pressure. The vessel and cover device can then be moved about conveniently in the cabinet for freeze drying to take place.

In some cabinets, the shelves 12 in turn rest on inner cooling coils fed by cooling line. A plurality of inner by-pass valves are also provided in the cooling system so as to control the action in individual trays. Thus, by the inner by-pass valves one way, the cooling liquid acts on the tray, otherwise, the tray is by-passed.

In practice, the by-pass valves are turned to freeze the biologic material to the solid state and then turned so that the cooling fluid by-passes the coils under the trays, permitting lyophilization to take place. After lyophilization has taken place the temperature sensor placed in the tray in contact with the material indicates that fact by a rise in temperature above the freezing point of water. This causes a switch to be activated permitting the cooling liquid to act on the tray protecting the lyophilized material from elevated temperatures.

When any tray with its containers is to be removed, the piston is actuated and the piston plate acts on the stoppers sealing the container so that the material therein is in a vacuum.

Since the containers placed in the vessel 30 may be of various sizes the piston plate 56 can be adjusted so as to rest on the stoppers 58 by a screw adjustment 80. Because of heat exchange, the containers 34 must be in contact with vessel 30 and cannot be raised from the vessel floor.

The temperature in the cabinet can be regulated by circulating a gas, e.g., air therethrough by means of a fan and inlet 82.

*Example I*

The tissue or fluid to be lyophilized is placed in a commercially available container (e.g. vial) with a neck and a rubber stopper with a side slit. This container is placed in the vessel i.e., a metal tray with a rim. The cover device with its piston plate resting on the rubber stopper is placed on top of the vessel or metal tray. The vacuum pump is turned on. The bleeder valve is closed. The cover device will now adhere to the metal tray because of atmospheric pressure. The evaporation of the water will cause the remaining water to freeze. Air or an inert gas is allowed to circulate around the metal trays at a temperature ranging from 4° C. to 80° C. depending upon the sensitivity of the material to heat. For most substances a temperature of 25° C. to 37° C. is satisfactory. For enzymes or hormones the lower temperature is used. Where the material desired is stable, higher temperatures may be used. After lyophilization is complete a pulse of air is fed to the piston. The piston plate moves down and closes the stoppers. The bleeding valve is opened to release the pressure so that the metal trays within the containers may be removed. The material is now sealed in the container and may be so stored.

*Example II*

The material to be lyophilized is placed in container. Stoppers with slits are placed over the containers but not pressed. The containers are placed in metal trays which in turn are placed on shelves in the cabinet which in turn rest on the cooling coils. The cooling liquid is directed through the inner cooling coils by means of a by-pass valve. When the material in the container is frozen the cover devices are lowered to rest on the vessel and the vacuum is applied. The cover devices are now pressed on to the vessel by the atmospheric pressure. The piston plate rests on the stoppers. The by-pass valve is now turned so that the cooling fluid clears the by-pass valve and is directed solely through the cooling coils in the cooling chamber. If ice is being evaporated the cooling chamber is preferably maintained at less than 45° C., and the atmosphere is maintained at 5° to 37° C. for heat sensitive materials. For materials not heat sensitive the atmosphere temperature may be raised to higher temperatures, as high as 60° C. to 100° C., depending upon the capacity of the cooling chamber. The vapor must be removed at such a rate as to maintain the water or other solvent in the material in the solid state. Atmospheric temperatures of 60° C. are satisfactory when rapid lyophilization is desired and water is the solvent, and the material to be isolated can withstand that temperature. When the residue is inorganic higher temperatures may be used.

After lyophilization is complete, the piston is activated. The piston plate is lowered forcing the stoppers down so as to seal the container, the stopcock leading to the vacuum chamber is closed and the bleeder valve is opened. This releases the pressure and allows the trays to be removed.

It is to be observed therefore that the present invention provides for an arrangement for lyophilization of a volatile constituent in containers with stoppers without using a thickwalled vacuum chamber. The containers are placed in a vessel which vessel in turn is placed in a thin walled cabinet having shelves therein for supporting the vessels placed in the cabinet. The cabinet has a gas feed line and outlet for circulating gas at a constant temperature. Adjacent the cabinet is a manifold having suction lines passing into the cabinet and tube means for a suction pump to act on the manifold. Adjacent the manifold is a cooling chamber with outer cooling coils. In the cabinet, cover devices are disposed over the vessels. These cover devices are at least partly flat so as to engage the vessels with containers therein and are made of a solid medium e.g., plastic which may be entirely flat or have a central dome. A lower at least partly flat resilient sealing medium such as rubber or Tygon may be affixed to the solid medium. In some cases these cover devices may be made entirely of a semi-resilient material, e.g., hard rubber. There is a central aperture in the cover device and an outlet duct sealed thereto for coupling to the suction line. A bleeder line and bleeder valve for allowing in air or inert gas after lyophilization communicates with the cover devices central aperture either internally or externally although preferably it is disposed in the cover device, i.e., in the plastic solid upper medium. Or, it can be located in the manifold. Advantageously, a stopcock is placed in the outlet duct of the cover device. For some biologic materials it is useful to have inner cooling coils adjacent the shelves of the cabinet. In the cover device central aperture is a fluid piston chamber housing a piston disposed for vertical movement therein. At the lower end of the piston is a piston plate designed to rest on the container stoppers. When lyophilization is complete a pulse of liquid or air is applied to the piston chamber actuating the piston. The piston plate then presses down on the stoppers closing the containers.

Passing through the cover devices are temperature sensitive means communicating with an electrical heat control unit. The inner and outer cooling coils are controlled by valve means also responsive to the heat control unit which can direct or cut off the flow to the inner cooling coils in the cabinet.

An advantage of the present instrument over the conventional tray drier is the fact that individual containers in vessels for drying may be added or removed without interfering with the lyophilization going on in the other vessels. Each vessel is also separately covered. Thus cross contamination does not occur with the instrument of the present invention.

Lastly, in the drawing, the cooled chamber is shown as being separated from the manifold but connected thereto by a plurality of lines. Those skilled in the art will readily appreciate that the manifold and cooled chamber may be slit longitudinally and fused at the slits. Or one elongated chamber could be used, only one end portion of which is cooled to act as the cooled chamber, the other portion acting as the manifold.

Furthermore, the resilient material used on the lower portion of the cover device may also be placed on the upper periphery of the vessel.

Although the present invention has been described in connection with preferred embodiments, it is to be understood that modifications and variations may be resorted to without departing from the spirit and scope of the invention as those skilled in the art will readily understand. Such modifications and variations are considered to be within the purview and scope of the invention and the appended claims.

We claim:
1. An arrangement of lyophilization of a volatile constituent in a container having a stopper, comprising in combination;
   a cabinet having shelves therefor supporting a vessel into which said container can be placed with at least one suction line passing into the cabinet;
   cooling coils, in said cabinet disposed so as to cool said vessel;
   at least one cover device in said cabinet designed to be disposed over said vessel made of an inert medium having a lower, at least partly flat resilient, sealing section, an aperture in said cover device and an outlet duct sealed thereto for coupling to said suction line, a bleeder line, and a bleeder valve communicating with said cover device aperture for differential pressure release; and,
   a piston chamber, piston rod and piston plate disposed in said aperture said piston plate being disposed to rest on said container stoppers, a fluid feed line to said piston chamber, so that the feeding of fluid thereto will act on said piston rod pressing said plate on said stopper sealing the container.

2. A device for lyophilization comprising in combination an inert structure having a lower, at least partially flat, sealing section, said structure having a central aperture therein; and outlet duct sealed to said structure and communicating with said central aperture; a bleeder inlet and a valve, with longitudinal opening in said structure communicating with said outlet duct to slowly permit gas to enter the apparatus; and,
   a fluid piston chamber, piston rod disposed for vertical movement in said chamber and horizontal piston plate on the lower end of said piston rod, said piston plate moving down on the application of a fluid pulse to said piston chamber.

3. A device as claimed in claim 2 including an inert solid upper medium and an at least partially flat resilient sealing medium for its lower section.

4. A device as claimed in claim 2, said upper medium being rigid plastic, at least a portion thereof being transparent.

5. A device as claimed in claim 2 including a temperature sensitive element disposed near said piston plate and, an electrical line from said sensitive element passing through the device for attachment to a heat control unit.

6. An apparatus for the lyophilization of a mixture containing a volatile constituent, housed in a container and preserving the residue after lyophilization in the container by stoppering the container under vacuum which comprises in combination,
   a flat bottom vessel into which a multiplicity of loosely stoppered containers can be placed, said flat bottom vessel being substantially deeper than the containers are tall and having an even upper rim disposed in a plane;
   a cover device disposed over said flat bottom vessel made of an inert medium having a lower flat resilient sealing section for making contact with the upper rim, said cover device being provided with an outlet duct for coupling to a vacuum line and an aperture fitted with a bleeder valve to release the vacuum;

a piston chamber attached to the center and underside of the cover device, a piston disposed for reciprocating movement in the piston chamber and a flat plate attached to the piston lower end, the piston plate being of an area smaller than the area of the flat bottom of the vessel and large enough to cover the loosely held stoppers in the container when disposed over the stoppers; and, a fluid feed line to said piston chamber, so that after lyophilization, the feeding of fluid to the piston chamber will act on the piston rod, pressing the plate on the stoppers, sealing the container under vacuum, the opening of the bleeder valve releasing the vacuum, and permitting the removal of the container sealed under vacuum.

7. An apparatus as claimed in claim 6, said cover device inert medium being rigid plastic, at least a portion thereof being transparent.

8. An apparatus as claimed in claim 6, including, a cabinet having shelves therein for supporting the flat bottom vessel, and, means for maintaining the temperature of said cabinet constant.

9. An apparatus as claimed in claim 8 including cooling means adjacent said vessel so as to condense vapors evaporating from liquid in said container.

10. An apparatus as claimed in claim 9, including means for controlling the temperature in said cabinet by circulating a gas therein at constant temperature.

References Cited by the Examiner
UNITED STATES PATENTS

| | | | |
|---|---|---|---|
| 649,012 | 6/1900 | Tapscott | 53—102 |
| 671,930 | 4/1901 | Leffingwell | 53—102 |
| 2,353,986 | 7/1944 | Barr | 34—5 |

WILLIAM J. WYE, *Primary Examiner.*